Figure 1:
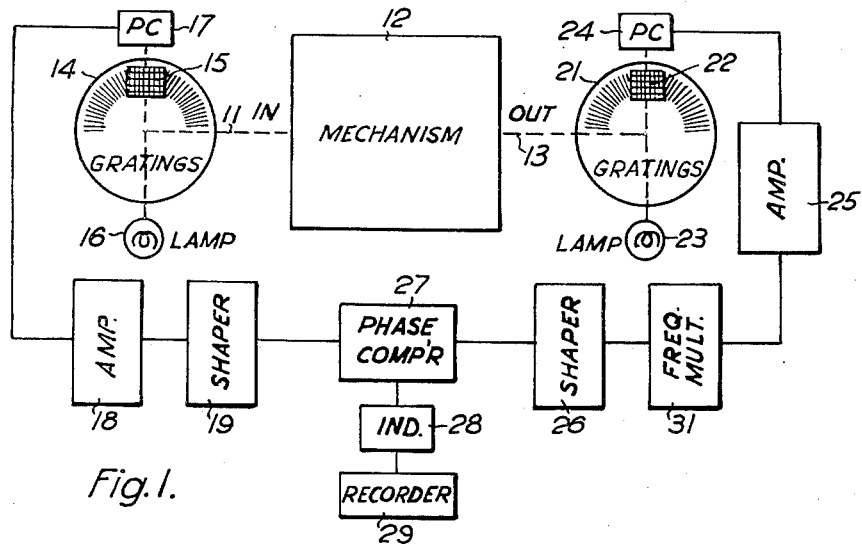

Sept. 18, 1962  C. TIMMS ETAL  3,054,902
MEASUREMENT AND CORRECTION OF ERRORS IN MACHINES
Filed June 1, 1959  2 Sheets-Sheet 1

INVENTORS
CECIL TIMMS
THOMAS WALKER AITCHISON
LEONARD ALFRED SAYCE

BY

ATTORNEYS

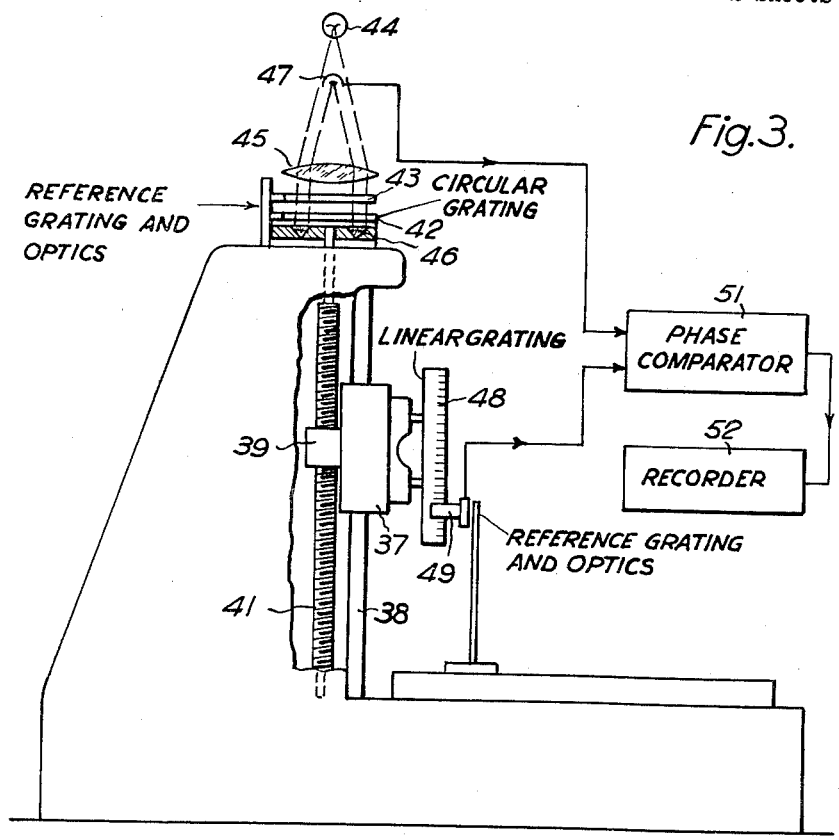
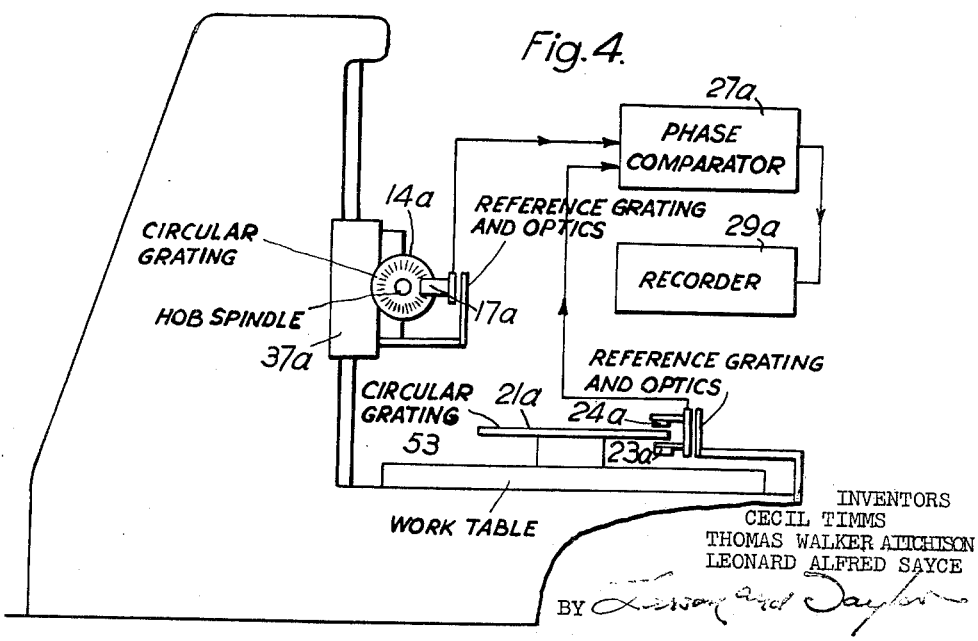

United States Patent Office

3,054,902
Patented Sept. 18, 1962

3,054,902
MEASUREMENT AND CORRECTION OF ERRORS IN MACHINES
Cecil Timms and Thomas Walker Aitchison, East Kilbride, Scotland, and Leonard Alfred Sayce, Hampton Hill, England, assignors to National Research Development Corporation, London, England, a British corporation
Filed June 1, 1959, Ser. No. 817,104
Claims priority, application Great Britain June 2, 1958
11 Claims. (Cl. 250—237)

This invention relates to the measurement of errors of motion or displacement in mechanisms in which an output element moves in response to the motion of an input element in accordance with a law which at least within the limits of accuracy required, can be expressed as a constant ratio between two integral numbers. Such mechanisms are exemplified by machine tools, transmission systems, and the like.

In all such mechanisms there is a risk that errors will arise between the input and outputt motions due to a variety of causes such as manufacturing tolerances or defects, elastic deformation, and so on in the interconnecting components. Even in the case of a 1:1 ratio effected by direct coupling, elastic deformation may introduce errors. It is one object of the present invention to provide means for continuously indicating or recording such errors during operation of the mechanism, and to this end a reference optical grating, hereafter called an index grating, is adapted to be secured in a datum position adjacent an input and an output member, respectively, of the mechanism whilst a corresponding grating of the same fineness of sub-division hereafter called a scale grating is adapted to be secured to each of the said members in suitable juxtaposition to the appropriate index grating; and an optical system is arranged to illuminate a respective photocell through each pair of gratings, the outputs of the photocells being fed to an electrical frequency comparator circuit whose output represents the instantaneous phase difference between input and output.

The scheme can be developed to correct errors as they appear by using the output signal from the comparator circuit to control a servo which may act upon the input or output end of the motion or within the mechanism itself.

Insofar as the correction is to be applied to a rotary motion, a differential gear may be included at a suitable position and the correcting motion of the servo is applied to the cage of the differential gear in the appropriate direction or to the sliding gear member of a correcting gear as described in British patent application No. 23,885/58 A. M. Uttley. Insofar as the motion to be corrected is a straight line motion, the servo may act through a lever or screw connecting the moving part such as a carriage with the index grating and the element the motion of which is to be corrected, e.g. a tool, which is rigidly connected with the index grating, this assembly of grating and element being mounted on the moving part so as to be movable in relation thereto. A similar scheme can be applied where the motion is along a slide which is not necessarily straight being for instance arcuate with a large radius and covering a motion, the extent of which is only a fraction of a circle.

It will be understood that the invention is concerned with the measurement and correction of errors which are quite small and such as arise in mechanisms of high class workmanship. Accordingly any correcting movement will be of very small amplitude and the servo will either include devices of considerable reduction ratio if motor driven or will consist of devices which themselves have a very small amplitude of motion, e.g. piezo-electric or magnetostrictive transducers. Such devices unlike a motor cannot deal with cumulative errors unless their total is within the total amplitude of motion afforded by the transducer but for the class of workmanship in view this is acceptable. With some types of mechanism cumulative errors cannot arise because the overall ratio of the mechanism is definite and positive and the errors are then such that though they may fluctuate they remain between certain positive and negative limits.

The invention will further be described with reference to the accompanying drawings which diagrammatically illustrate some examples embodying the invention.

Figure 2:
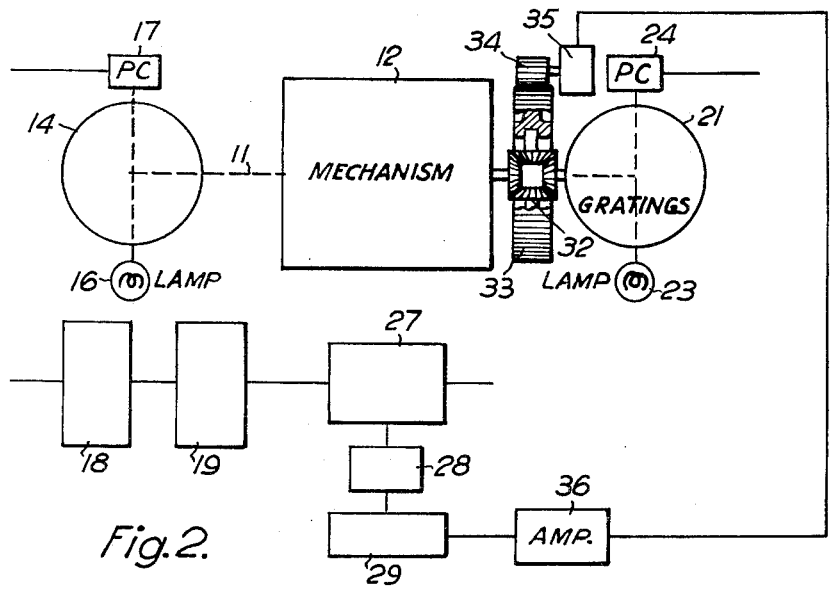

FIGURE 1 shows in block diagram form the essence of the invention for ascertaining errors in the relationship of movement between the input and output of a mechanism both movements being rotary movements, FIGURE 2 shows part of FIGURE 1 provided with means for correcting error as it arises, FIGURE 3 is a side view illustrating the application of the invention to the feed motion of the control slide of a machine tool which might be a gear hobbing machine, FIGURE 4 is a side view showing the application of the invention to the ascertainment of errors in relationship between the rotation of the hob and the reaction of the wheel being cut in a gear hobbing machine, Referring to FIGURE 1 a rotational movement of a shaft indicated by the line 11 constitutes the input to a mechanism 12, for example a gear box from which a rotational movement is delivered on the input side to a shaft 13. With most mechanisms for example toothed wheel gearing, the average ratio of the input speed to the output speed is quite definite and fixed but the instantaneous value of the ratio may fluctuate. To enable this to be measured to the shaft 11 is secured a radial optical grating 14, i.e. a grating having radial lines and with it cooperates a fixed reference grating 15 of the same angular pitch as the grating 14. It is here assumed that both gratings are transmission gratings. Light from a source indicated by a lamp 16 together with such other optical elements as may be necessary for instance a collimating lens or mirror, is directed through the gratings on to a photoelectric cell 17. During rotation of the shaft 11 the relative movement of the gratings 14, 15 produces a moire fringe pattern which falls on the photoelectric cell and the output of the cell is directly related to this pattern. Usually it will be necessary to pass the output through an amplifier indicated at 18 and still further to pass the output of the amplifier through a shaping circuit indicated at 19 by which a suitable wave form is derived. Similar provision, namely a moving grating 21, reference grating 22, lamp 23, photoelectric cell 24, amplifier 25 and shaping circuit 26 are associated with the output shaft. The outputs from the two shaping circuits 19, 26 are then compared in a phase comparing circuit 27, having an output linearly proportional to the difference in phase of its two inputs, the output from which is supplied to an indicator 28 and if desired also or instead to a recorder 29.

In order that the above arrangement may operate it is necessary that the two inputs to the phase comparing circuit should be of the same nominal frequency. If it so happens that the ratio of the speeds of the shaft 11, 13 is 1:1, the two pairs of grating may be of identical pitch and nothing more is needed. If, however, there is a change of speed in the mechanism 12 there are two possibilities either or both of which can be used. First if the ratio is not very great, gratings of corresponding pitches may be used, i.e. if the output speed is lower than the input speed, the number of lines in the grating 15 will be lower than the number in the grating 21 in the same ratio. The other possibility is to introduce a frequency changing circuit indicated at 31. This may be a multiplying circuit or a dividing circuit depending on the effect of the mechanism 12. It will be clear that if necessary this circuit 31 could be on the other side, that is between the amplifier 18 and shaping circuit 19. It will also be clear that in some cases it may be necessary or desirable to have a frequency changing circuit on both sides.

If the mechanism 12 is or includes a variable ratio gear box, there may be a corresponding number of frequency changing circuits such as 31 and a switch for selecting the appropriate frequency changing circuit ganged to the gear ratio selector.

Since large frequency ratios can readily be dealt with by means of conventional frequency changing circuits whilst relatively small ratios can be accommodated by a suitable choice of the pitch of the gratings or even in the case of linear gratings by adjustment of the direction of the lines on the scale grating to the direction of the line of motion or both of these factors, it is possible to cover a wide variety of applications with a comparatively small number of different grating pitches.

The accuracy obtainable by the invention depends on the accuracy of the gratings themselves but it is to be noted that the use of an index grating of finite length extending over a comparatively high number of lines in itself improves the accuracy because if the errors are not too great, an averaging effect is obtained. For the particular case of rotary motion it is desirable for the index grating to cover the whole circle. Annular optical elements will enable this to be done using a single light source and a signal photoelectric cell. In the case of linear gratings it is not usually practically possible to have a constant overlap but one of the gratings must be long enough to cover the whole motion to be monitored. It is usually convenient for this to be carried by the moving part but cases may arise where it is more convenient to make the long grating the fixed grating and the short grating the moving grating, though this involves mounting the light projecting system and photo cell on the moving part. With regard to the gratings used, recent developments in the technique of photographic copying and correction of a master precision grating facilitate the production of matching gratings each having a high degree of accuracy of line spacing.

As above mentioned the error signal coming from the phase comparing circuit can be used to control a servo whereby the error is corrected as it appears. A scheme for effecting such correction in the case of rotary motion is illustrated in FIGURE 2 which corresponds to part of FIGURE 1. However in the output shaft 13, there is included a differential gear 32, the cage 33 of which is coupled by teeth meshing with a pinion 34 to an electric motor 35. As long as the motor 35 is stationary the two parts of the shaft 13 coupled by the differential gear will rotate at equal speeds in opposite directions. The error signal after amplification at 36 is supplied to the motor 35 and drives it in such direction that the additional rotation imposed on the outer end of the output shaft is such as to reduce the error. Since, as a general rule the error merely fluctuates between certain limits, it would be possible to dispense with the motor 35 and anchor the cage by a piezo electric or magnetostrictive transducer arranged to change its length under the effect of the error signal and thus impose the necessary correction to the motion of the output shaft.

It will be clear that this correction could be applied to the input shaft 11 at a point between the grating 15 and the mechanism 12. It would also be possible to arrange the correcting devices within the mechanism itself in suitable cases.

FIGURE 3 illustrates the case in which the two motions which are compared are a rotary motion and a linear motion. In this example, which relates to a machine tool such as a gear hobbing machine, the linear motion is that of a carriage 37 running on a guideway 38, the movement being imparted through a nut 39 on the slide meshing with a feed screw 41 rotated by means not shown. The rotary motion is that of the feed screw 41 itself. On the end of the screw is mounted a radial grating 42 above which is a second fixed radial grating 43. In this particular example the grating 43 extends over the whole circle and illumination is provided from a light source 44, the light from which is rendered parallel by a collimating lens 45. Both gratings are of annular form and an annular reflector 46 is provided below the grating 42 by which the light is returned within the gratings and is then concentrated by the lens 45 on a photoelectric cell 47, the output of which (after any necessary amplification) is fed into a phase comparator 51. To enable the light source 44 and cell 47 to be located at spatially separate points, the annulus of the lens 45 which collimates the light should be of slightly different focal length from the annulus which directs the light on to the cell 47. This can be conveniently provided for by making the lens a Fresnel lens.

To deal with the linear motion a grating 48 of sufficient length to cover the feed motion to be examined, is mounted on the slide 37 and this cooperates with a stationary index grating with associated light source and photoelectric cell generally indicated at 49. The output from the cell (after any necessary amplification) is also fed into the phase comparator 51. The output from the comparator is fed into a recorder 52. As in the previous example the signal may also or instead be supplied to an indicator or to means for correcting errors in the feed motion of the slide 37, e.g. by the interposition of a differential gear between the grating 42 and the feed screw 41 or by making the nut 39 movable in relation to the slide 37 and controlling its position by a lever or screw actuated by a motor or transducer.

It will be understood that frequency changing circuits can also be included.

In FIGURE 3 it may be said that the input motion is radial and the output motion linear but there is no change in principle or in the general layout in applying the invention to a machine or mechanism in which the linear motion is to be regarded as the input motion and the rotary motion as the output motion, as for example in a mechanism in which a pinion is rotated by linear displacement of a rack.

FIGURE 4 is again concerned with a gear hobbing machine and shows provision for comparing the rotation of the slide with the rotation of the workpiece, a matter of great importance if accurate wheels are to be cut. Since here a rotary motion is being compared with a rotary motion, the principles involved are exactly the same as in the case of FIGURE 1 and corresponding parts have been given the same references with the suffix *a*. In this figure the spindle carrying the grating 14*a* is that of the hob itself and this spindle is journalled on the slide 37*a* which corresponds to the slide 37 of FIGURE 3. The workpiece is carried by a rotary worktable 53 and the grating 21*a* is concentrically mounted on this table. Amplifiers and frequency changers are not indicated nor correction of error but these can be provided for as before.

Another case which may arise is where it is necessary to compare two linear motions. By way of example, this can arise in taper turning by the method of applying simultaneous feeds to two slides movable at right angles to one another. This is done for instance by feeding the carriage of a lathe along the bed by the ordinary feed mechanism and simultaneously applying a feed to the cross slide by the aid of a follower moved along a slide set at an angle to the axis of the main feed. For such cases, each of the two motions actuates a combination of two linear gratings with the necessary illuminating means and photoelectric cell, the signals from the two pairs of gratings being compared and indicated or recorded or used for correcting the motion in a similar manner to that above described.

Since the invention makes use of the measurement of phase differences, it is able to measure errors of very small magnitude. Thus in the case of linear motion, linear errors of the order of ±0.0001 inch can easily be measured using a line pitch of the order of 0.001 inch which from the optical point of view is quite a coarse pitch, and if care is taken to obtain truly sinusoidal signals linear errors of one or two orders finer can be measured. Similarly with regard to rotary motion, errors down to one second of arc can readily be measured. Another advantage of using a pair of gratings for deriving moire fringe from each of the two motions to be compared, is that the two motions can be continuously compared. For the purpose of phase comparison however, it is desirable that the speeds should be held as near constant as possible to avoid difficulties with the circuitry. Here it may be mentioned that though the speeds of motion may be low, frequencies which can conveniently be dealt with will be obtained if the gratings have sufficiently close line spacing. Such spacing can nevertheless be relatively coarse from the optical point of view and the advantage is that errors in the initial setting up of a pair of gratings of the kind known as "wedge" errors—i.e. lack of parallelism between the planes of the gratings—have a correspondingly less serious effect on accuracy of the results obtained by the system. The invention is thereby rendered more practicable as a workshop test technique, and a standard kit of equipment becomes feasible having fairly general applicability to different types and sizes of mechanism.

In all cases, it is preferred to arrange that the reference grating, photocell, and optical system are arranged in a common fixed housing adapted to be clamped to a frame part of the mechanism under test, the moving input or output component of the mechanism carrying only the respective moving grating, so that mechanisms designed to have only small output powers can be tested under actual working conditions without the introduction of any spurious errors due to inertia effects of the moving grating.

Since a system according to the invention is capable of affording a continuous output, cyclic errors in a mechanism can readily be observed. Moreover, the mechanism can be tested by the system under actual working conditions. The use of electronic frequency changing circuits ensures that each complete test equipment need only include a minimum number of gratings, and these may be of a very economically produced type. The equipment is easily portable and can be made very compact, so that small or relatively inaccessible mechanisms can be tested thereby.

In addition to the examples above given, the invention can be applied to the feed motions of machine tools such as lathes and milling machines or again it can be applied to gear testing machines wherein a gear under test meshes with and is driven by a master gear. Again as well as the correcting devices above described, correction can be applied for instance through a variable slip coupling or clutch such as a hydraulic torque converter or a magnetic clutch in which case the servo may be arranged, to govern the amount of hydraulic fluid admitted to the coupling or the strength of the magnetic field in the clutch so as to reduce errors in the output motion to a minimum.

It should also be mentioned that though the invention is above described with reference to both gratings being transmission gratings, it is possible to use a reflection grating for one grating of each pair in the manner disclosed in co-pending British patent application No. 16,484/59.

We claim:

1. Means for comparing the motions of two components of a mechanism having a law which at least within the limits of accuracy required can be expressed as a constant ratio between two integral numbers comprising two reference optical gratings adapted to be secured each in a datum position adjacent an input and an output member, respectively, of the mechanism, two corresponding scale gratings adapted to be secured respectively to said members each in suitable juxtaposition to the appropriate reference grating; and an optical system arranged to illuminate respective photocells through each pair of gratings consisting of reference grating and corresponding scale grating, the outputs of the photocells being fed to an electric frequency comparator circuit.

2. Means according to claim 1 in which each pair of gratings has such line spacing as to produce an output signal of the same frequency from its respective photocell.

3. Means according to claim 1 in which a frequency changing circuit is included between at least one photocell and the frequency comparator circuit.

4. Means according to claim 3 for comparing the motion of a mechanism having more than one ratio, in which frequency changing circuits are provided corresponding to the several ratios.

5. Means according to claim 1 also including servo correcting means actuated from the output of the frequency comparator circuit to correct errors in the motion as they appear.

6. Means according to claim 5 as applied to a rotary motion in which a differential gear is included and the correcting movement of the servo is applied to the cage of the differential gear.

7. Means according to claim 5 as applied to a straight line motion in which the servo acts through a mechanical reduction device connecting the moving part of the servo with the element the motion of which is to be corrected.

8. Means according to claim 5 in which the servo comprises an electromechanical transducer.

9. Means according to claim 1 in which both the motions compared are rotary.

10. Means according to claim 1 in which one of the motions is rotary and the other linear.

11. Means according to claim 1 in which both of the motions are linear.

References Cited in the file of this patent
UNITED STATES PATENTS
2,861,345    Spencer               Nov. 25, 1958